US006944624B2

(12) United States Patent
Orton et al.

(10) Patent No.: US 6,944,624 B2
(45) Date of Patent: Sep. 13, 2005

(54) METHOD AND SYSTEM FOR CREATING AND IMPLEMENTING PERSONALIZED TRAINING PROGRAMS AND PROVIDING TRAINING SERVICES OVER AN ELECTRONIC NETWORK

(75) Inventors: Peter Z. Orton, Hillsborough, NC (US); Nancy J. Lewis, Pleasantville, NY (US); Dick W. Richardson, Charlotte, NC (US); Leon S. Wasson, Thornton, CO (US); John M. Wattendorf, Alexandria, VA (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 09/947,179

(22) Filed: Sep. 5, 2001

(65) Prior Publication Data

US 2003/0046265 A1 Mar. 6, 2003

(51) Int. Cl.[7] .............................................. G06F 17/30
(52) U.S. Cl. ............................ 707/102; 707/3; 707/4; 707/5; 707/100; 707/101
(58) Field of Search ........................... 707/3, 5, 4, 100, 707/101, 102, 104.1, 10; 706/927; 434/322, 362, 350; 709/217

(56) References Cited

U.S. PATENT DOCUMENTS 6,438,353 B1 * 8/2002 Casey-Cholakis et al. .. 434/350
2001/0039002 A1 * 11/2001 Delehanty ................... 434/322

* cited by examiner

Primary Examiner—Frantz Coby
(74) Attorney, Agent, or Firm—Derek S. Jennings; Cantor Colburn LLP

(57) ABSTRACT

Method system and storage medium for creating and implementing a personalized training program. The method includes receiving a request to generate a personalized training program by a user and retreiving feedback surveys associated with the user. The feedback surveys are received from the peers, direct reports, and supervisors of the user. The feedback surveys include skill levels and knowledge acquired by the user as perceived by the peers, direct reports, and supervisors. The method also includes assessing the self-perceived skill levels and knowledge acquired by the user via input received from the user in response to a questionnaire compiling information provided in the feedback surveys and results of the assessing, generating a personalized training plan for the user as a result of the compiling, and tracking the progress of the user during implementation of the personalized training program.

81 Claims, 16 Drawing Sheets

|  | REQUIRED | SUGGESTED | PER YOUR REQUEST |
|---|---|---|---|
| WORKING ENVIRONMENT | Study the Quick View on Working Environment and take the Diagnostic Quiz. | Review the Quick View on Working Environment and take the Diagnostic Quiz. | Take the Diagnostic Quiz. |
| LEADER APPROACHES | Study the Quick Views on Leadership Approaches and Leadership Approaches Impact Working Environment and take the Diagnostic Quiz | Review the Quick Views on Leadership approaches and Approaches Impact Working Environment and take the Diagnostic Quiz | Take the Diagnostic Quiz |
| COACHING | etc. | Note: Only ONE BOX per row is highlighted in each row. | |
| E-BUSINESS | | | |

FIG. 5

WORKING ENVIRONMENT ELEMENTS

1. OPENNESS. THE DEGREE TO WHICH PERSONS FEEL FREE AND ENCOURAGED TO EXCHANGE INFORMATION IN THE WORKING ENVIRONMENT.

\*IDEAS-RECEPTIVITY TO NEW IDEAS AND SUGGESTIONS; WILLINGNESS TO CONSIDER DIFFERENT POINTS OF VIEW.

\*FEEDBACK-WILLINGNESS TO GIVE AND RECEIVE FEEDBACK.

FIG. 6

☐ Customer Insight

*Outstanding XYZ managers understand their customers. They place themselves in the minds of the customer. They spend time with the customers to understand the current and future underlying needs and to anticipate solutions.*

Comes up with solutions that go beyond the customer's request or expectation and add significant value.
Views the customer's business through the customer's eyes, and XYZ's.
Keeps people focused on creating a deep understanding of the customer's world.
Strives to understand and to satisfy underlying and future needs of customers.
Acts with customer satisfaction as a top priority.
Takes responsibility to solve customer problems.

☐ Breakthrough Thinking

*Outstanding XYZ managers challenge conventional thinking, and focus on possibilities. They thrive on complexity, identify and develop new solutions, and foster creativity and innovation.*

Acts outside the boundaries when it is the right thing to do.
Generates new ideas not constrained by traditional thinking or procedures.
Sees connections and patterns not obvious to others.
Communicates creative solutions to others effectively.
Establishes breakthrough improvements as a business priority.
Exploits chaotic and complex business situations to achieve breakthrough solutions.
Creates new strategies for positioning XYZ to win.
Makes decisions based on strategic implications, not past precedent.

FIG. 7A

☐ Drive to achieve

*Outstanding XYZ managers look for ways to accomplish work faster, at lower costs, and with higher quality. They set challenging goals for themselves and others, and take calculated risks to improve performance.*

Sets challenging goals that result in significant performance improvements.
Finds ways constantly to make things simpler, faster, and better.
Takes calculated risks by committing significant resources and /or time to address new business opportunities.
Makes changes in work processes to continuously improve performance.
Acts to minimize the impact of bureaucracy and inefficiency in the organization.
Focuses energy on the things that impact the business the most.
Demonstrates persistence in the pursuit of goals.

MOBILIZE TO EXECUTE

Focusing on winning isn't enough. Our greatest leadership challenge is to execute. Successful leaders demonstrate four key competencies that allow them to implement with speed and flexibility:

☐ Team Leadership

*Outstanding XYZ managers link their vision to XYZ's strategy. They lead change and create a sense of urgency to meet challenges and implement strategies. They set direction, establishing goals and maintaining accountability.*

Creates a climate where new ideas are accepted and expected.
Acts as a leader of change.
Fits leadership styles to the situation.
Communicates a clear sense of direction that focuses the organization with a new sense of urgency.
Links team vision and goals to XYZ strategy.
Establishes realistic, but challenging, goals for the team.
Holds team accountable for acting consistently with strategic direction.
Creates a sense of pride and belonging among team members.
Translates XYZ plans into actions.
Takes bold steps needed to keep initiatives moving forward particularly when they've stalled.
Empowers teams to make decisions and take actions.

☐ Straight Talk

*Outstanding XYZ managers tell the truth. They openly share information with peers, managers and subordinates and tell the "whole" story, not just their position. They are role models for doing what is right.*

Acts to promote a climate characterized by open, timely, and widely-shared communication.
Shows congruence in words and deeds - walks the talk.
Models high business and ethical standards consistent with XYZ policies and practices.
Acts with integrity.
Uses clear language and plain talk to communicate.
Seeks honest feedback from others to improve own actions.
Speaks to others with candor even when doing so is difficult.

☐ Teamwork

*Outstanding XYZ managers work collaboratively with their own teams and across organizational and geographical boundaries. They empower their teams to achieve excellence.*

Demonstrates the ability to work in a global, multicultural and diverse environment.
Takes actions to build a cohesive team.
Looks for opportunities to collaborate across the global XYZ.
Solicits input from multiple sources to make better decisions.
Keeps commitments made to others.

☐ Decisiveness/Decision Making

*Outstanding XYZ managers make and act on tough decisions with speed, a sense of urgency, and tenacity. They seek input to the decision-making process as needed to make excellent decisions.*

Acts decisively even when complete information is not available (i.e., manages complexity and ambiguity).
Invites participation in decision making based on clear and legitimate reasons for involvement.
Implements decisions with speed and urgency.
Makes decisions with speed and urgency.
Handles crises effectively.

FIG. 7C

SUSTAIN MOMENTUM

XYZ's best leaders use these qualities to obtain lasting results that continue to grow and build for the future. They sustain momentum by applying three key competencies:

☐ Building Organizational Capability

*Outstanding XYZ managers act to build the organization's longer-term capability to produce and sustain excellent results. They focus on learning.*

Adapts team processes and structures to meet changing requirements.
Builds effective organizational networks.
Encourages bench marking against sources outside the company for innovative solutions.
Shares knowledge and lessons learned with others appropriately.

☐ Coaching/Developing Talent

*Outstanding XYZ managers actively develop others to build a strong team now and for the future. They coach by expressing expectations, providing feedback, and seeking learning opportunities.*

Provides constructive performance feedback.
Helps advance talented people, even if it means losing them to another part of XYZ.
Expresses positive, but realistic, expectations to others about their performance potential.
Motivates others to reach their highest potential.
Works with direct reports to assign developmental tasks proactively.
Helps others learn to become effective leaders.
Assists others to perform their leadership roles.
Demonstrates behaviors that foster a climate where learning is valued.

☐ PASSION FOR THE BUSINESS

The core of the Leadership Competencies for XYZ Managers Model is passion for the business.

*Outstanding XYZ managers are outwardly passionate about our business, winning in the marketplace, and what XYZ technologies and services can do for the world.*

Focuses passionately on winning in the marketplace.
Displays a level of enthusiasm that is contagious.
Communicates an inspiring vision of XYZ's future.
Accepts business reality and reacts in a positive and confident way.
Demonstrates understanding of technology's potential to transform the world.
Demonstrates a sense of excitement about XYZ solutions.

FIG. 7D

Management Development for working environment elements, click the button at the bottom to create your Manager Development plan and leadership approaches

| Add to Your Plan | Competencies | Key Comp's | Comps You Choose | Your Score |
|---|---|---|---|---|
| ☑ | Breakthrough Thinking | ☆ | | 07%ile |
| ☐ | Straight Talk | | | 82%ile |
| ☐ | Passion for the Business | ☆ | | 80%ile |
| ☐ | Teamwork | | | 78%ile |
| ☐ | ...ing Organizational Capacity | | | 78%ile |
| ☐ | Personal Dedication | | ✓ | 73%ile |
| ☐ | Coaching/Developing Talent | ☆ | | 72%ile |
| ☐ | Team Leadership | ☆ | | 70%ile |
| ☑ | Drive to Achieve | | ✓ | 57%ile |
| ☑ | Decisiveness...Decisionmaking | | | 52%ile |
| ☐ | Customer Insight | | ✓ | 52 %ile |

Back To The Top | Review Competencies | Review Working Environment | Review Leadership Approaches

Working Environment

Working environment affects business results and can mean the difference between winning or losing in the marketplace. I have ranked the environment sub-elements, with those most in need of your attention at the top based upon one of two reasons:

- Your score ranks below the 34th percentile; or
- A significant gap exists between what direct reports perceive as the actual environment and the "should be" environment Sidebar:
- Management Development Main Page
- Main Page
- Solve a Problem
- Prepare for Managing@XYZ
- Develop You
- Help

| Search | Help | Feedback |

LEADERSHIP APPROACH RECOMMENDATIONS

Describe your work conditions. Check the appropriate box  0 = not at all;  5 = always; 1, 2, 3, and 4 are gradients in-between.

| NOT AT ALL | | | | | ALWAYS |
|---|---|---|---|---|---|
| 0 | 1 | 2 | 3 | 4 | 5 |

*(Dogmatic)*

1102  I lead inexperienced employees who are not yet fully committed to the organizational goals.

0      1      2      3      4      5

The work performed by my direct reports is routine and highly structured.

0      1      2      3      4      5

I know more about how to do the work of my workgroup than any of my direct reports.

0      1      2      3      4      5

*(Approach type 2)*

1102  Supporting work conditions sample 1

METHOD AND SYSTEM FOR CREATING AND IMPLEMENTING PERSONALIZED TRAINING PROGRAMS AND PROVIDING TRAINING SERVICES OVER AN ELECTRONIC NETWORK

BACKGROUND

This invention relates generally to computer-based training, and more particularly, the present invention relates to a method and system for diagnosing, creating, and implementing personalized training programs and providing related training services over an electronic network.

Online education has become a popular form of learning, particularly for individuals who are remotely located from a particular university or corporate training center, require a self-paced program, or are physically disabled. In one application of Internet-based training (or digital learning), subject materials are presented simultaneously to groups of students in virtual classrooms. Virtual instructors coordinate the lessons and present content while students interactively participate and conduct threaded discussions among one another. Testing is provided online, and assessments and feedback are later provided.

Another application of Internet-based training (IBT) is known as "self-paced instruction" or "e-learning". E-learning is anywhere, anytime self-paced online instruction. This delivery option offers interactive Web-based instruction in different formats, such as text, graphics, spreadsheets, streaming audio and/or video, etc. Multimedia courseware can be acquired via the World Wide Web where interested students can choose from comprehensive 'certification programs', single subject courses, or even 'just-in-time' modules which target narrowly tailored, mission-critical, and time-sensitive topics. Just-in-time training allows business managers to instantly link specific employee training to real business problems.

A growing number of businesses are discovering the advantages of online education in the workplace. IBT provides a cost-effective and convenient means to qualify employees for particular jobs. IBT can save time and money and maximize businesses' training investments by eliminating the travel necessary to attend training facilities. More businesses today are consolidating and standardizing their training programs and presenting them online. These new online programs continue to be fueled by new and innovative technology that enhance the administration, execution, and tracking of the programs such as calendar, workflow, and messaging tools.

Specific solutions known to exist in this area include vendor-authorized training programs, individual and group training programs, as well as courseware development and technical assistance provided by online applications service providers (ASPs). Content delivery may occur via an Intranet or Internet medium and services may include hosting the server for the customer. Open content delivery tools include computer-based training, Internet-based training, Web-based training, distance learning, multimedia, CD, synchronous and asynchronous delivery tools. The individual or organization to be trained registers for these training sessions and the course content is delivered by the ASP over the World Wide Web. The ASP handles student enrollment, online payment, course grading and student feedback over the Web as well.

While the above solutions may provide some enhanced features over the prior art, they unfortunately leave much to be desired. Many are simply "one size fits all" training plans offering virtually identical training for all learners. While one trainee may receive some measurable benefit from a particular program, another trainee may receive very little or no benefit due to the variant needs and existing skill levels of each trainee. Sifting through catalogs of topics and deciding which course to select requires a broad-based understanding not only of the current business climate, working conditions, and company goals, but also the trainee must also be able to look inward at his/her strengths, weaknesses, and shortcomings in an objective manner. Further, the trainee must be able to prioritize among the various courses or topics and select those which are most valuable to that trainee's position at a particular point in time. An ongoing ability to re-prioritize the direction of the training plan is essential to account for industry fluctuations, changing market conditions, new technologies, and company needs.

What is desired, therefore, is a method and system for creating and implementing a personalized training program for a user taking into account the user's interests, skill level, company needs, and other relevant data.

BRIEF SUMMARY

An exemplary embodiment of the invention relates to a method and system for creating and implementing a personalized training program. The method includes receiving a request to generate a personalized training program by a user; retrieving feedback surveys associated with the user; assessing the user's knowledge relating to leadership competencies, working environment, and leadership approaches; generating a training plan for the user in response to the feedback surveys and user's knowledge; and tracking the user's progress relating to the training plan. The invention also provides a method for directing a user to online resources for resolving specific problems. The invention further enables a user to develop a long term career development plan and receive automatic email alerts relating to new and existing resources according to the user's interests and career plans.

BRIEF DESCRIPTION OF THE DRAWINGS

Referring now to the drawings wherein like elements are numbered alike in the several FIGURES:

FIG. 5 is a computer screen window depicting an exemplary list of action items directed to a user for completion as a prerequisite to attending a learning lab;

FIG. 6 is an exemplary listing of the working environment elements and sub-elements used by the training services tool;

FIGS. 7A–7D describes an exemplary listing of defined leadership competencies adopted by a business enterprise and used by the training services tool;

FIG. 8 is a computer screen window depicting an exemplary online profile generated by the training services tool for ranking a user with respect to comparative leadership competencies;

Figure 9:
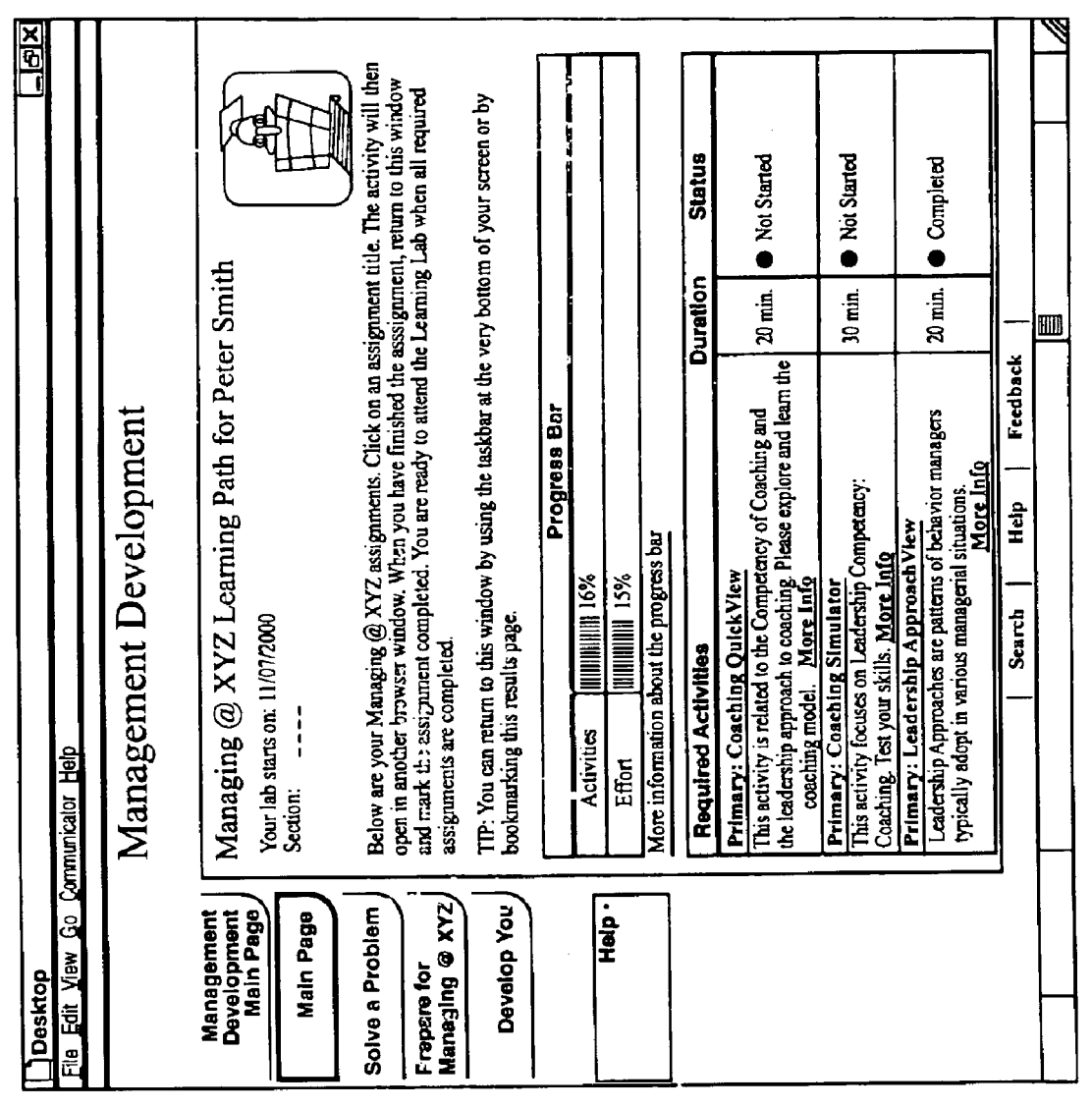

FIG. 9 is a computer screen window depicting a sample personalized training plan generated by the training services tool;

FIG. 11 is a computer screen window depicting an exemplary training services tool questionnaire for establishing a user's current business conditions;

DETAILED DESCRIPTION OF THE PREFERRED EMBODIMENT

Figure 1:
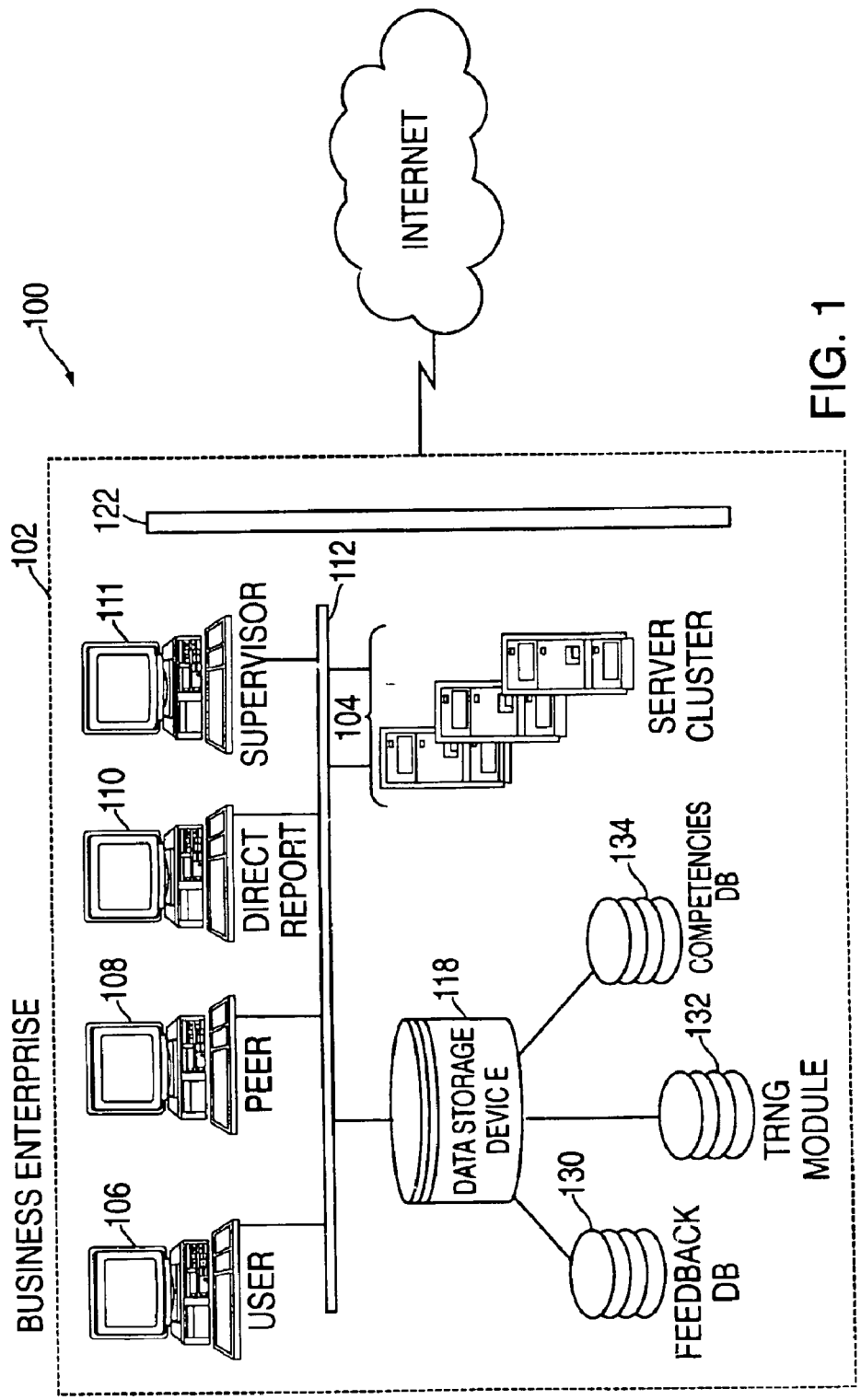
FIG. 1 is a portion of a network system upon which the training services tool is implemented in an exemplary embodiment.

In an exemplary embodiment, the training services tool is implemented via a network system such as that depicted in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes a business enterprise 102 operating in a client/server architecture model. Business enterprise 102 comprises a server cluster 104 and data storage device 118 connected through network 112 to client systems 106, 108, 110, and 111. Client system 106 represents a trainee (also referred to as 'user', 'employee', or 'manager') of business enterprise 102. Client system 108 represents a peer of the trainee of client system 106. A peer is generally a colleague or co-worker of the trainee and is typically an individual working at the same or similar organizational level as the trainee. Client system 110 represents a direct report or subordinate (also referred to as 'work group member') of the trainee of client system 106. Client system 111 refers to a supervisor (also referred to as 'superior' or 'trainee manager') of the trainee of client system 106. It should be noted that any number of client systems may be utilized by business enterprise 102 and that each trainee may have multiple peers and direct reports each of whom are operating a client system. For purposes of illustration, only one trainee client system 106 is shown, as well as a single peer client system 108, direct report client system 110, and a supervisor client system 111. Each of client systems 106, 108, 110, and 111 may comprise a personal computing device such as a desktop, laptop, or other similar apparatus known in the art. The term "business enterprise" refers to the organization implementing the training services tool of the invention.

Network 112 may comprise a LAN, a WAN, or other network configuration known in the art. Further, network connections may include wireless technology, radio-based communications, telephony-based communications, or a combination of the above. For purposes of illustration, however, network 112 is a LAN Intranet. Access is limited to internal devices and applications through firewall 122, which protects business enterprise 102 from unauthorized access. Firewall 122 may employ encryption and SSL technologies for securing the data utilized by business enterprise 102.

Business enterprise 102 is running suitable multi-platform supported server software for creating secure, interactive Internet and Intranet applications, and which allows information in data storage device 118 to be presented to end users or client systems via replication capabilities. For purposes of illustration, business enterprise 102 is running Lotus Domino (TM) as its server software. Domino (TM) has been selected for its object-oriented design features. Business enterprise 102 executes the training services tool, among other applications via one or more servers of server cluster 104, client systems 106, 108, 110, and 111, or a combination of the above. Business enterprise 102 is also running a groupware application such as Lotus Notes (TM) which allows client systems to access information through it replication capabilities provide e-mail services, and supports a secure intranet/extranet architecture.

Data storage device 118 resides within intranet 112 and may comprise any form of mass storage device configured to read and write database type data maintained in a file store (e.g., a magnetic disk data storage device). Preferably, data storage device 118 is configured to support an object-oriented architecture. Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via one or more servers of server cluster 104. Server cluster 104 is a combination of Domino (TM) servers which allows business enterprise 102 to maintain up-to-date training materials, trainee data, competency data, and other information in a real-time environment through its replication features. Servers in server cluster 104 share information with each other, as well as with client systems, storing the most current data for access by user systems.

Client systems 106, 108, 110, and 111 may access server cluster 104 via Lotus Notes (TM)—compliant software located on client systems 106, 108, 110, and 111. Software may be Lotus Notes (TM) although it is not necessary in order to realize the advantages of the present invention. For example, client systems 106, 108, 110, and 111 may operate web browser software in order to perform the functions necessary via the training services tool described herein.

Databases associated with data storage device 118 include a feedback database 130, a training module database 132, and a complacencies database 134. These databases are accessed by the training services tool in order to implement activities described herein. Feedback database 130 stores surveys and survey responses received from client systems 106, 108, 110, and 111 related to information requested via the training services tool concerning a trainee. This information may be in the form of online questionnaires and/or surveys and may include any data desirable by business enterprise 102. Training module database 132 stores resources utilized by users or trainees of the training services tool including condensed text-based and/or graphic information conveying the high points of a topic (also referred to as 'quickviews'), a series of real-life or fictitious examples to illustrate the topic as applied to a situation (referred to as 'quickcases), simulation materials that provide interactive peer-to-peer practice sessions directed to a specified topic whereby the user can assess his/her ability to solve a problem or handle a situation (referred to as 'simulators'), and any other type of learning tool desired by the business enterprise. These training materials may be generated by the business enterprise or may be commercially acquired products. Competencies database 134 houses information acquired from consulting groups relating to areas of business which are critical or regarded as most important to the business for its success. The competency categories or areas may be defined by the business or outside consulting group and developed as an ongoing business plan. The competencies selected each comprise one or more associated behaviors that further define the competency. For example, the 'straight talk' competency 704, shown in FIG. 7C, includes behaviors such as honesty, integrity, and candor. Eleven competencies have been selected for illustrative purposes and are listed and described in FIGS. 7A–7D.

A replica of a selected database is made available for client systems 106, 108, 110, and 111 via Intranet 112 as necessary. Additionally, applications running on server cluster 104 may be programmed to systematically conduct scheduled replications, whereby database replicas are temporarily stored in a queue awaiting replication (not shown). Replications may be scheduled by business enterprise 102 as frequently as desired in order to provide access to the most current up-to-date information.

The training services tool includes Lotus Notes (TM) databases that reside on data storage device 118. Data storage device 118 resides within enterprise's 102 intranet 112. Since it is within intranet 112, it is accessible to all of enterprise's 102 employees who have proper access permissions. These database can be replicated to portable devices, such as laptop computers, PDAs, etc., allowing access to information while traveling. Many replicas may be necessary and will depend upon the number of authorized systems. Enterprise 102 is also executing email software via the Intranet as well as any internal applications desired in order to receive email notifications from administrators concerning new training materials or courses available, as well as for transmitting surveys to appropriate client systems.

Figure 2:
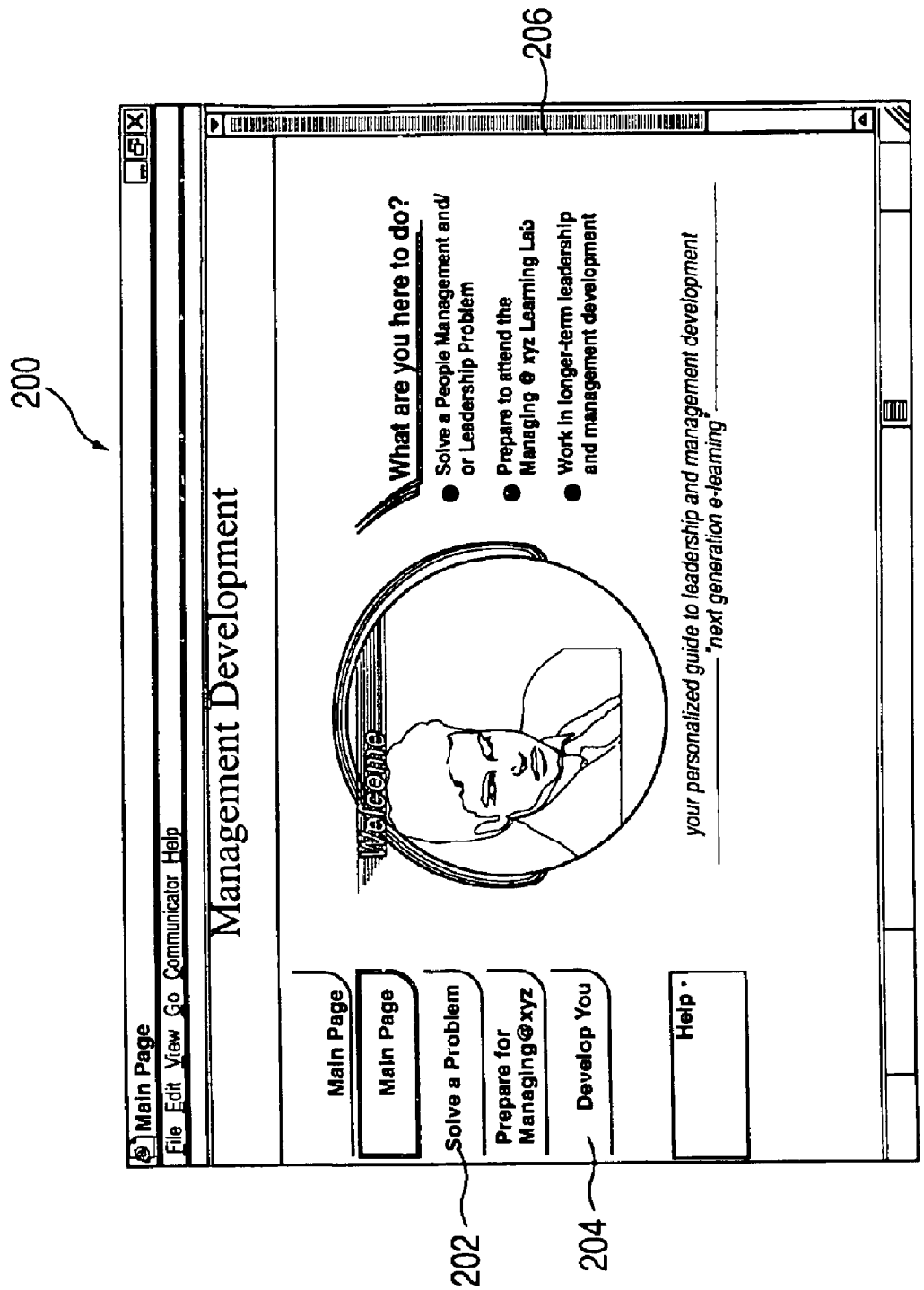
FIG. 2 is a computer screen window illustrating an exemplary main menu screen for initiating the problem resolution, personalized training, and long term career development features of the training services tool.
Figure 3:
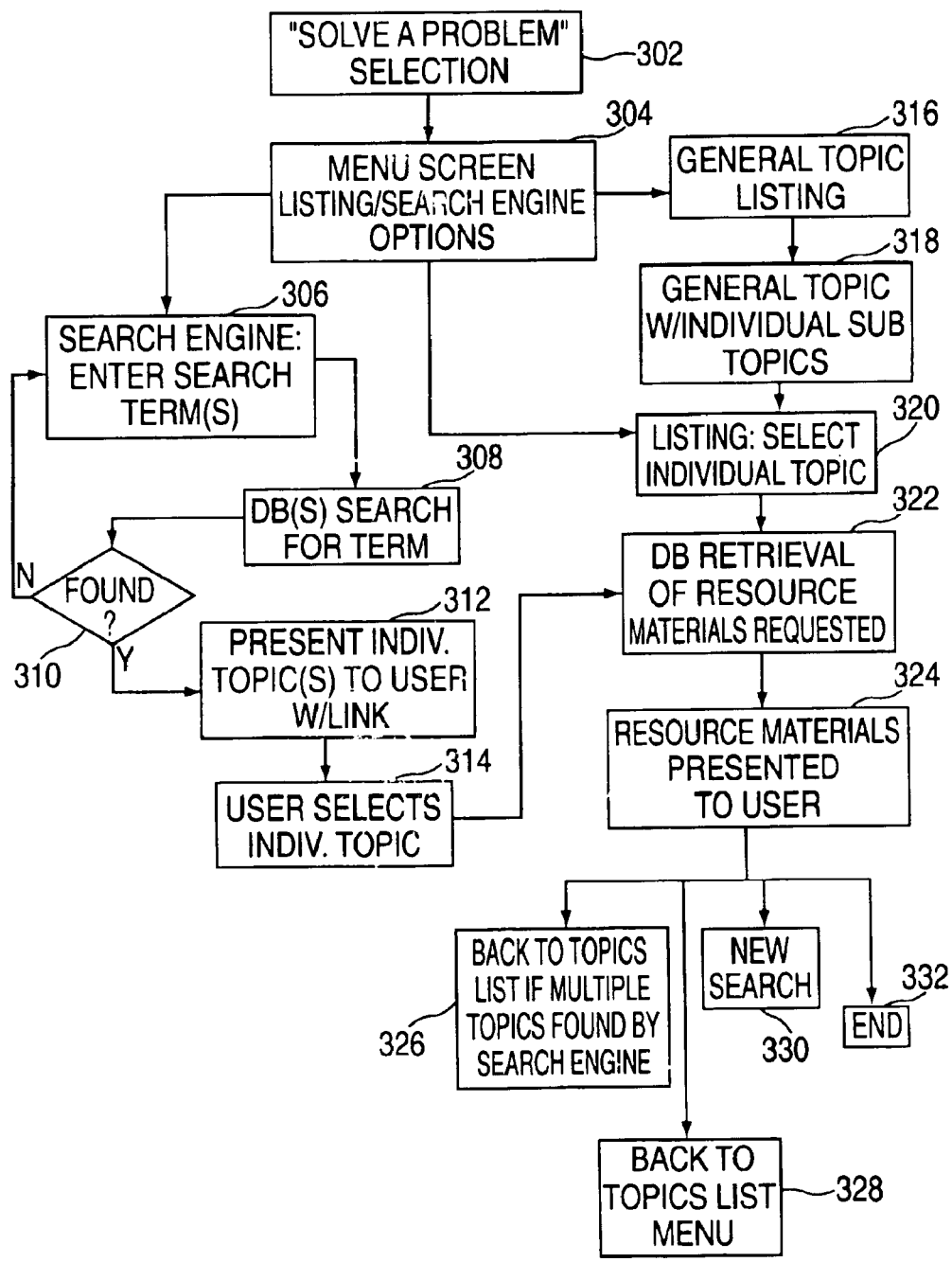
FIG. 3 is a flowchart describing the process of accessing online resources for specific problem resolution and related information in one embodiment of the invention.

A framework for the flow of information associated with the implementation of the problem resolution feature of the training services tool is described in FIGS. 2 and 3. In one embodiment, an employee of business enterprise 102 accesses the training services tool because of a need for immediate assistance relating to a specific problem. For example, the employee is a manager for business enterprise 102 who has received information that a key employee who reports to this manager is considering leaving the company for another opportunity. The manager accesses the problem resolution feature of the training services tool at step 302 by selecting "Solve a problem" (202 of FIG. 2) from the menu choices provided. The main menu screen 200 of FIG. 2 may display a changeable "tout" with illustrations (not shown) for highlighting new company policies, informing users of issues of concern, business trends, and other useful information. A submenu screen (not shown) is presented at step 304 which allows the manager to initiate a key word search utilizing a search engine, select from an index of general subject matter topics, or view an alphabetical listing of individualized topics. If the user wishes to use the search engine, the user enters one or more search terms in the space provided on the submenu screen (not shown) at step 306. Once entered, the tool searches training module database 132 of data storage device 118 at step 308 looking for the term(s). If the term is not found (step 310) the user is returned to the previous screen (step 306) for allowing additional searches to proceed. If the term is found, then flow proceeds to step 312 where the topic(s) incorporating the search term(s) is/are provided for the user along with a link to the resource materials. At step 314, the user selects the desired topic and the tool retrieves the materials from training module database 132 of data storage device 118 at step 322 and presents it to the user at step 324. Once the user has reviewed the materials, he/she is directed in one of several directions including returning back to the topics list (where multiple topics were found in the database relating to the search term(s)) at step 326, conducting a new search at step 330, or ending the search entirely at step 332.

If the user instead wishes to select from a complete list of individual topics that are available for perusal rather than use the search engine, the user selects the individual topic listing from the submenu at step 304, and reviews the alphabetized listing of topics presented by the training services tool. The user then selects a topic from the individual topic list at step 320. The requested materials are retrieved at step 322 and presented to the user at step 324. One or more of steps 326–332 may be repeated as desired by the user. The information may be presented to the user in the form of quickcases, quickviews, simulators, or other modalities. Examples of individual topics may include 'Motivation', 'Rewards and Recognition', 'Identifying Future Leaders', 'Mentoring', and 'Giving and Receiving Feedback'.

Alternatively, a user may wish to find a topic by general subject matter. The user selects 'general topics list' from the submenu at step 304, whereby a list of general topics are presented to the user at step 316. The user may select the appropriate general topic and a list of individual topics relating to that general topic are listed below it at step 318. The user may then select an individual topic at step 320 and the resource materials are retrieved at step 322 and presented to the user at step 324. Again, one or more of steps 326–332 may be repeated. An Employees' within which the above individual topics 'Motivation' and 'Rewards and Recognition' are categorized, and 'Career Management' within which the above topics 'Identifying Future Leaders', 'Mentoring', and 'Giving and Receiving Feedback' are categorized. Each topic listing, regardless of the mode of search, includes an associated modality; that is, each topic is listed along with its corresponding mode of presentation. As indicated above modes of presentation may include quickviews, quickcases, simulators, as well as virtual group instruction and live classroom lectures.

Another feature of the training services invention includes the personalized training tool which allows each individual trainee to gain insight about his/her existing business skills and/or abilities from a variety of sources in order to prepare to attend a training lab or professional development class (also referred to as 'learning lab') scheduled by business enterprise 102. Many times an employee's self-perceptions are not mirrored by his/her colleagues and subordinates. The personalized training tool of the invention enables an employee to acquire candid, pointed information regarding his/her current competencies as perceived by peers, direct reports, and superiors resulting in an useful, three-dimensional point of view. Additional information about the leadership approaches used and the working environment created is provided by self analysis and feedback from the manager's direct reports. This information is then processed by the training services tool, and combined with the trainee's own data relating to his/her interests and goals resulting in a comprehensive and personalized training plan that targets the employee's weak areas while taking into account personal interests and career goals.

Figure 4:
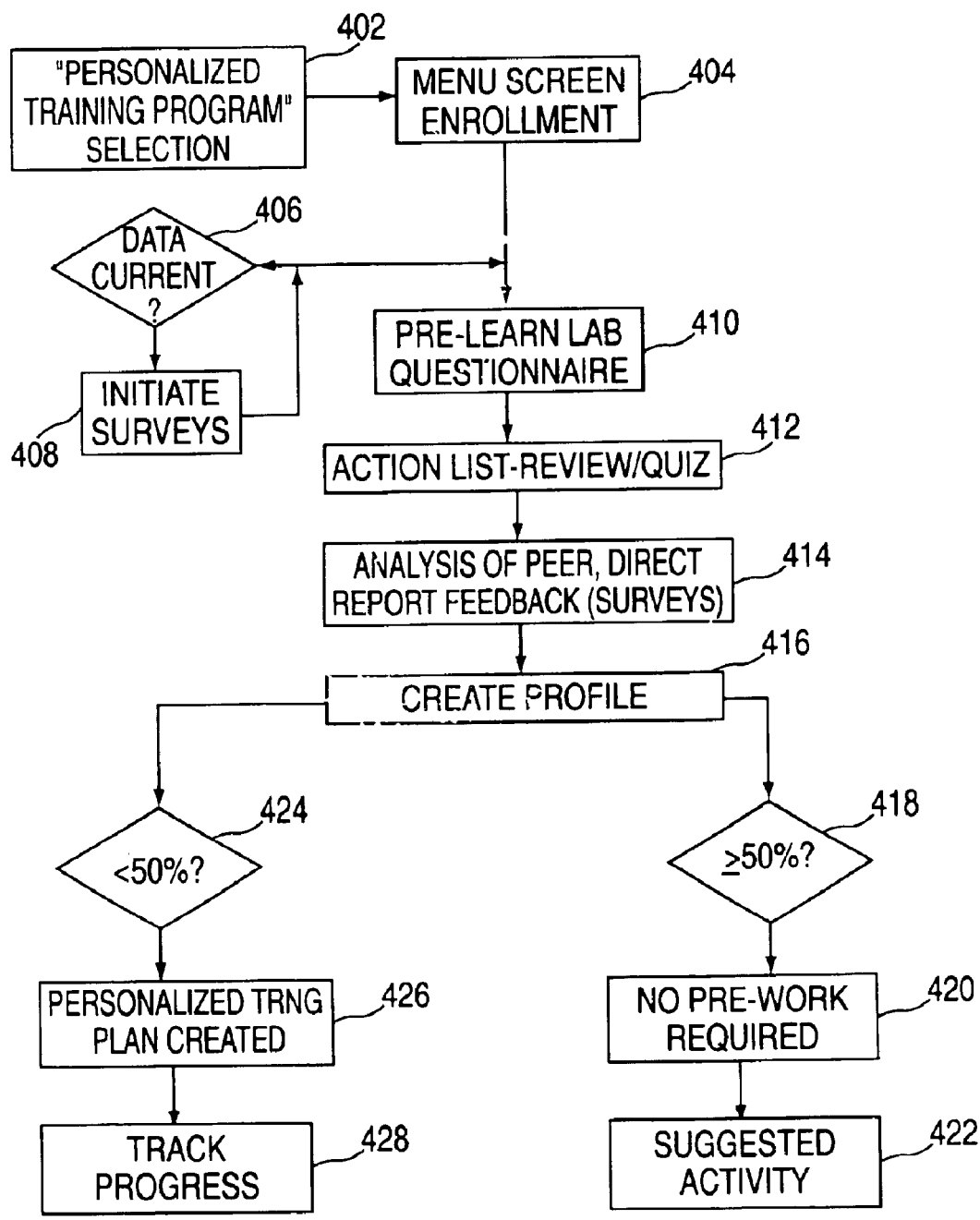
FIG. 4 is a flowchart describing the personalized training tool processes of the training services tool for creating and implementing a personalized training program for a user in a second embodiment of the invention.

FIG. 4 describes how the personalized training tool generates and implements a personalized training program for a user. A user interested in this option selects "Develop You" (204 of FIG. 2) at step 402 either from the training services tool icon on the user's desktop or through the program tool listings. A main window (not shown) is then presented at step 404 whereby the user is directed to provide personal information such as name, position, title, etc. Throughout this process, the tool will display an approximate time for completion of the questions so that the user may accommodate this time. The tool checks the currency of the user's data in the system at step 406 and initiates surveys for gathering information required by the tool where the data are not current at step 408. The user may identify appropriate recipients for these surveys whereby the tool generates and transmits the survey via email to each recipient. Recipients typically include the user's supervisor, peers, and direct reports. Online surveys may consist of several dozen questions that require each recipient to rate the trainee in different skill areas relating to user's leadership abilities. The recipients respond to the request and send the surveys to an administrator of enterprise 102 by clicking a reply option. The surveys are then recorded, compiled for each trainee, and stored in feedback database 130. If not already completed, a pre-learning lab questionnaire is then presented to the user at step 410 listing the following four questions relating to the user's current knowledge level whereby 'XYZ' refers to business enterprise 102, the user's employer.

(1) How well do you know the XYZ leadership approaches shown to have a significant impact on the organization's working environment?

( ) I know the behavioral indicators of the approaches and which approaches to use depending upon the situation. 1a ( ) I can describe the approaches and I know that they have a significant impact upon the organization's working environment. 1b ( ) I don't know or can't remember the leadership approaches. 1c (2) How well do you know the working environment elements that XYZ uses to help leaders improve business results and focus on the use of optimal leadership approaches (these elements have been shown to have a significant impact on bottom line business results)?

( ) I know the behavioral indicators of each element and how my actions influence my work group's working environment. 2a ( ) I can describe the elements and I know that they have a significant impact upon business results. 2b ( ) I don't know or can't remember the working environment elements. 2c (3) How well do you know the XYZ coaching model?

( ) I use it and can teach it to others. 3a ( ) I understand the key components and have tried the model. 3b ( ) I don't know or can't remember the components. 3c (4) If asked to give a ten-minute presentation to a group of new employees concerning XYZ's global e-business strategy, could you do so with almost no preparation?

( ) Yes ( ) No 4a

When the user clicks on one of the three answer choices a sliding screen, window, or appropriate feature appears beneath the choice with a response. Sample responses are provided below.

1b Because the learning lab depends heavily on your understanding of the leadership approaches, I recommend that you review the leadership approaches and approaches impact on working environment quickviews and take the short diagnostic quizzes to verify to yourself that you know these approaches well enough to participate effectively. I also recommend that you complete the approaches scenario in the leadership simulator. Would you like to go to one of these now (each quickview will take about ten to fifteen minutes, the simulators will take fifteen to twenty minutes)?

( ) Yes, quickview ( ) Yes, simulator ( ) Not now, ask again next time

1c Because the learning lab depends heavily on your understanding of the leadership approaches, I recommend that you study the leadership approaches and approaches impact on working environment quickviews and take the short diagnostic quizzes to verify to yourself that you know these approaches well enough to participate effectively. I also recommend that you complete the approach scenario in the leadership simulators. Would you like to go to one of these now (each quickview will take about 20–30 minutes, the simulator will take 15–20 minutes)?

( ) Yes, quickview ( ) Yes, simulator ( ) Not now, ask again next time

2a Because understanding the working environment elements will be important to your contribution to your success in the upcoming learning lab, do you want to take a short quiz to verify to yourself that you know these elements well enough to participate effectively in the lab?

( ) Yes, diagnostic ( ) Yes, simulator ( ) No ( ) Not now, ask again next time 4a (For 'no' and 'not sure': The work you will be doing in the learning lab focuses on improving your working environment to achieve business results. Our business today is in the context of global e-business. It is, therefore, important that you have a working knowledge of XYZ's e-business goals and strategy. You can learn the basics by reading ('name of resource here').)

Based upon the results of these four questions, the training services tool develops an action item listing of required, recommended, and user-requested activities at step 412 as illustrated further in FIG. 5. For those users who are determined to require no actions be undertaken, an advanced topic may be suggested by the tool if desired.

At step 414, the tool analyzes the survey results, comparing and ranking the user's scores with those of other individuals in his position or a similar position.

At step 416, the tool creates an online profile for the user based upon all of the above information and presents it to the user. A sample computer screen illustrating a profile is shown in FIG. 8. An online profile ranks the user's job proficiency with that of his/her peers in order to provide insight as to the user's comparative skill level. This information may be useful in that it can be used as a baseline for future goal setting and progress tracking. The tool looks at the user's percentile ranking as compared to his peers with respect to each of the eleven competencies surveyed by accessing feedback database 130. For each of the eleven competencies in which the user ranked greater than or equal to the fiftieth percentile (step 418), the tool responds that no further lab pre-work is necessary at step 420, although there may be a strong recommendation to build upon strengths and not just to overcome shortcomings. Additionally, the tool may recommend an advanced topic for review or suggest a topic which may be of interest to the user at step 422.

Likewise, for each competency in which the user ranked below the fiftieth percentile (step 424) as compared to others ranked in feedback database 130, the tool generates a syllabus of suggested or recommended resources along with links to these resources at step 426. This personalized training plan is presented to the user for implementation. The tool tracks the progress of the user throughout the course of each topic or module as well as overall progress of the entire collection of modules that comprise the training plan at step 428. The tool keeps the user apprised of his/her progress. Once the user completes the requested training modules, he/she is ready to attend the scheduled learning lab.

A further embodiment of the invention includes a long term needs training program that allows a user who does not wish to take part in a learning lab, or perhaps has already done so, to acquire new and advanced training skills in accordance with the user's long term career goals and/or the company's long term needs. The progress made throughout the program is tracked by the tool and allows a user to modify the plan at any time in order to account for changing business working environments and/or the user's long term career goals.

Figure 10:
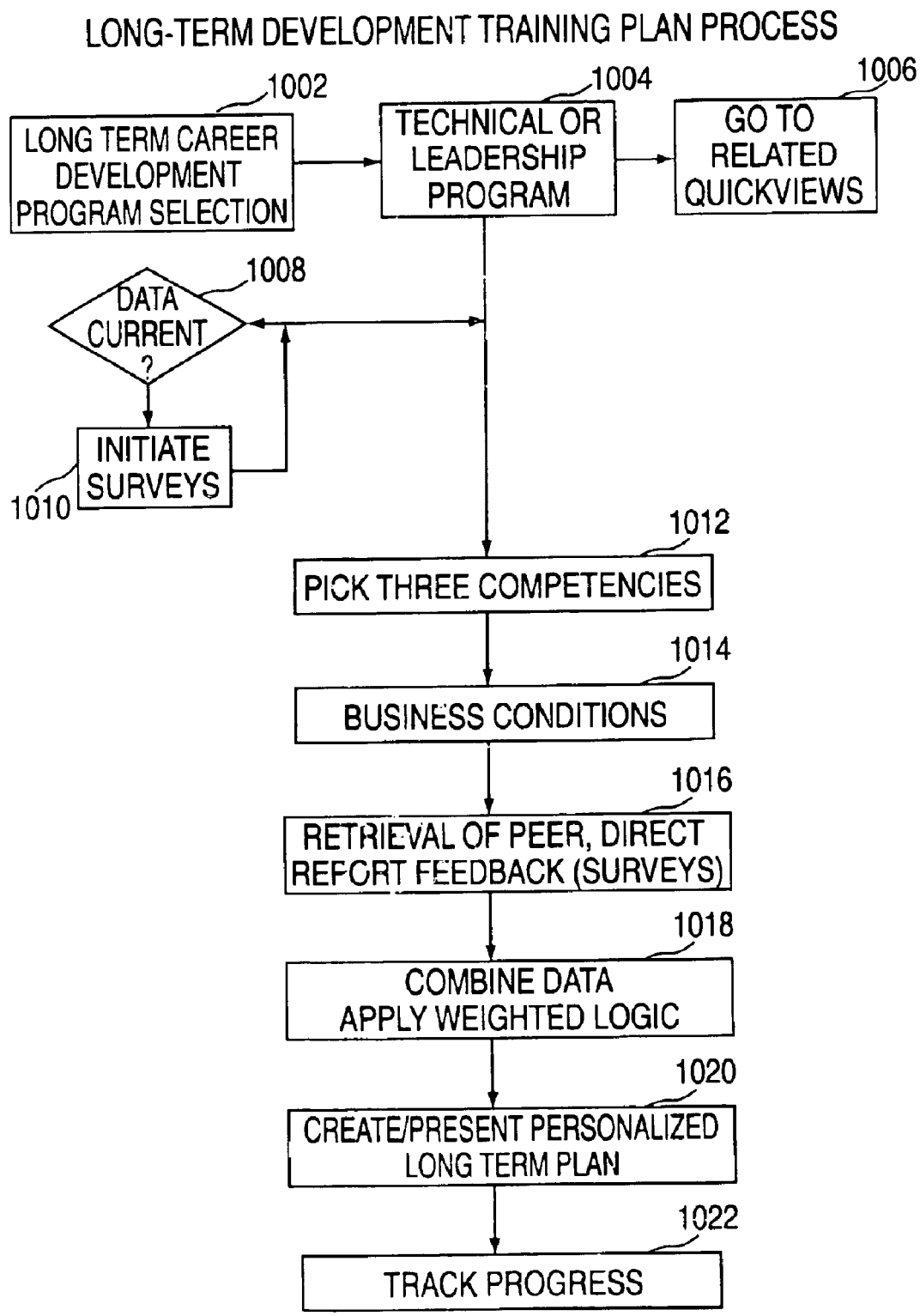
FIG. 10 is a flowchart of the long-term career development process for creating and implementing a personalized technical and/or leadership career plan.

The process of initiating a long term development training plan is described in FIG. 10. The user selects the Long Term Career Development selection 206 from main menu screen 200 of FIG. 2 at step 1002. The user is presented with two choices at step 1004. The user may either choose to develop his/her professional or technical skills whereby the user is directed to the appropriate resource materials pertinent to his/her job at step 1006, or the user may choose to develop his/her leadership or management skills. If the later option is selected, the tool checks the user's survey data in feedback database 130 to see if it is current at step 1008. If it isn't, the tool initiates the surveys at step 1010 and then allows the user to return to a previous screen whereby more training options are presented pending the results of the survey responses. Surveys are transmitted to peers, direct reports, and superiors of the trainee, as appropriate for the particular survey, and are directed to acquiring information and perceptions of the leadership abilities, competencies, and working environment conditions which exist in the workplace with respect to the subject manager or trainee. Recipients of competency surveys include a trainee's manager, peers, and direct reports, while recipients of the leadership approaches and working environment surveys include the trainee and his/her direct reports. The surveys and analysis of the responses received are described further herein.

If the trainee's data is current, the user is asked to select three competencies from the eleven competencies listed (shown in FIGS. 7A–7D) which are most important for his/her job position at step 1012.

The user is asked to provide additional information relating to his/her perception of current business conditions. Questions are presented to the user at step 1014, a sample of which is shown for illustrative purposes in FIG. 11. Questions provided may be selected by business enterprise 102 or may come from existing commercial products on the market. Answers to these questions are used for assessing a user's leadership approach. Terms provided in parentheses 1102 such as dogmatic are displayed for the tool's administrator only for assessment purposes. Each of these terms represent one of the various leadership approaches designated by enterprise system 102 and implemented by the training services tool. Any number and type of leadership approach categories may be used by enterprise 102 as desired. Leadership approach questions are coded for use in analyzing the user's leadership approach type and for integrating the results with other survey data as described further herein.

Once the survey responses are in, the tool retrieves the responses at step 1016 and combines the data at step 1018 as described herein. With respect to the leadership competency surveys, the tool generates a profile for the user indicating his/her percentile rankings for the three competencies selected, as well as the competencies which he/she was ranked the highest and lowest via the surveys. If one or more of the three competencies selected by the user are the same as the highest and/or lowest ranked competencies, then the user will be presented with less than five competency results. The user is asked if he/she would like to begin working on any of these competencies and whether the user would like to add any competency training to the recommendations as a result of the feedback provided.

Leadership approaches data are analyzed as follows. Various questions relating to the leadership approaches are evaluated. The answers to these questions are grouped by approach types or categories (as indicated in FIG. 11) such as dogmatic. The answers provided range from zero to five as shown in FIG. 11. These answers are further coded such that each of answers zero to two are assigned a code '0' and each of answers three to five are coded as '1'. Each group of questions is further processed as follows.

Codes determined for each question within the group are combined. If the sum total is zero, then a condition code 'zero' is set by the tool. If the sum total is one, then a condition code of 'one' is set by the tool. If the sum total is greater than one, then a condition code of 'two' is set by the tool.

Approach indicators are established by the tool and stored in feedback database 130 for assessing a user's current leadership approaches which are critical to the manager for a particular job position. Each of the condition scores will be multiplied by its corresponding approach score taken from feedback database 130 as shown below.

Primary approach. (Over 66%) Approach score is 0

Secondary approach. (50%–66%) Approach score is 1

Tertiary approach. (Defined as not having significant impact on your working environment) Approach score is 2

Primary approaches are those that have the most significant impact upon the working environment that a manager creates. The assigned values (e.g., a primary approach is assigned a zero) are used to determine when an approach should be used more frequently to match business conditions. For example, if conditions suggest that the use of the dogmatic approach is warranted, and if the dogmatic approach is scored as a tertiary approach, the respondent will be advised to consider using the dogmatic approach more frequently. The product of the condition score and the approach score for each of the approach types produces the following "Approach Salience Based on Conditions" Results where "C" is the condition score and "A" is the approach score:

|    | C0 | C1 | C2 |
|----|----|----|----|
| A0 | 0  | 0  | 0  |
| A1 | 0  | 1  | 2  |
| A2 | 0  | 2  | 4  |

The possible results are 0–4 whereby a higher resulting number indicates that a particular leadership approach being used by the trainee is having a serious or negative impact on the working environment. Based upon these results, the tool provides a suggested course of action accordingly.

Working environment surveys are also analyzed by the tool. The types of information in these surveys may include working environment elements and sub-elements, a sample of which is shown for illustrative purposes in FIG. 6. For each working environment elements and sub-element question, the tool assesses where the trainee ranks as compared to others at a similar organizational level resulting in a percentile number referred to as 'actual working environment'. Each survey recipient is also asked what he/she believes the working environment should be with respect to each element and the tool then ranks this trainee resulting in a percentile number referred to as 'should be working environment'. The tool then evaluates these two numbers for each working environment element and sub-element score.

Working environment scores are assigned values based upon the size of the gap between actual and should be scores, and upon the percentile ranking of the actual scores (the relative ranking compared to the scores of all managers in the database on this element). A gap of 20 or more between the actual percentile score (the assessed perception of the working environment that actually exists) and the "should be" percentile score (the respondent's assessment of what he or she believes the working environment should be) is cause for the manager to work on the gap (i.e., find out what may be causing this and work to resolve it). Additionally, if the actual score is in the lower third of the database, this also indicates a working environment element that needs attention. A working environment element is assigned a value of 0 if the gap is less then 20 and the actual score is above the 33rd percentile. If the gap is greater than 20, or if the actual score is in the lower third of the database, the working environment element is assigned a value of 1. Otherwise, the working environment element is assigned a value of 2. Managers of the trainee are encouraged to further investigate and take appropriate actions to improve any working environment elements with a score of 1 or 2. The tool suggests that the trainee work on those elements with higher scores first because these potentially have the most negative impact upon bottom-line business results.

Figure 12:
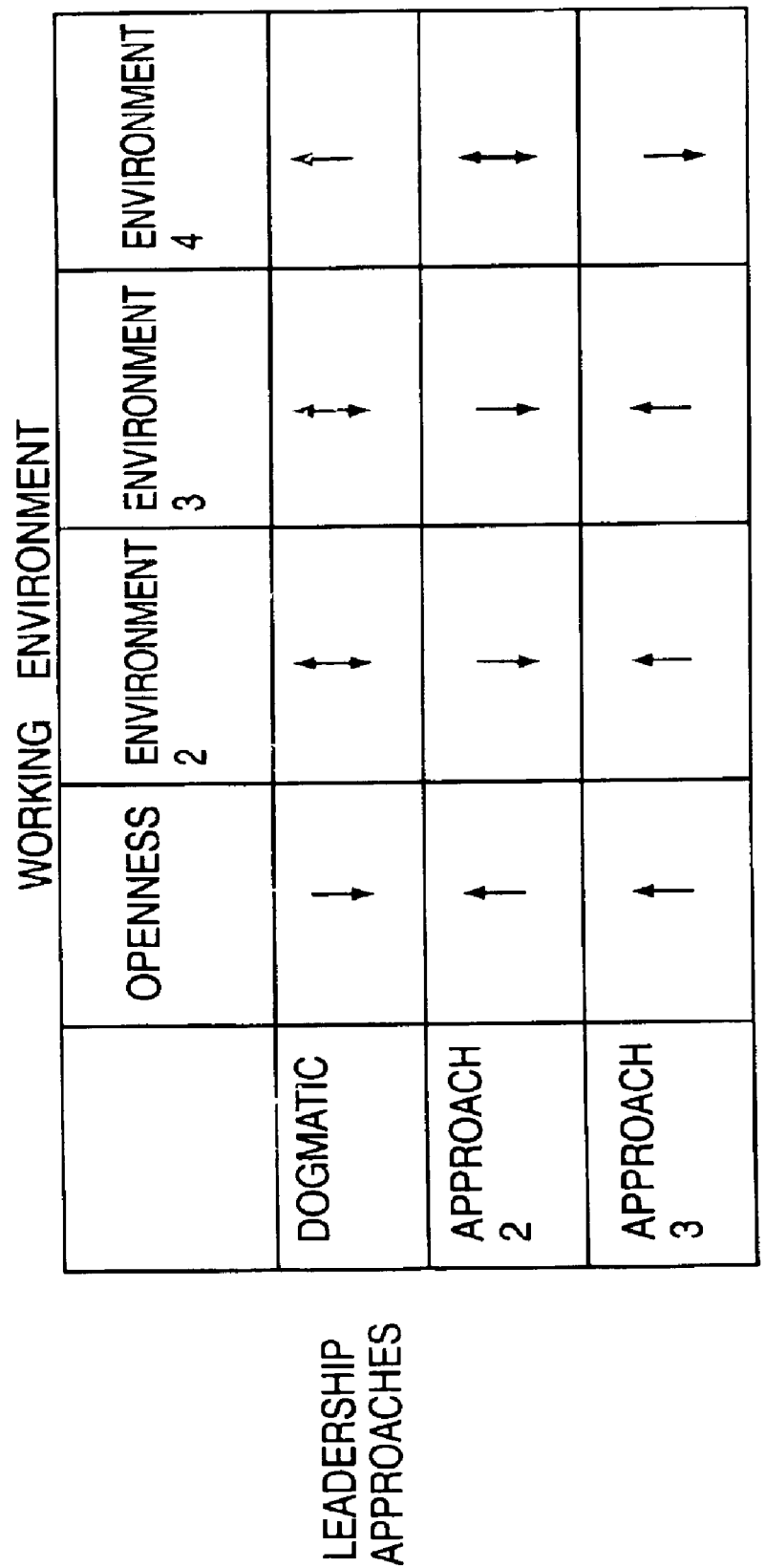
FIG. 12 is an exemplary impact matrix for analyzing the impact of a user's leadership approaches on a respective business working environment.
Figure 13:
FIG. 13 is a computer screen window depicting a sample personalized long-term career development plan generated by the training services tool.

The tool then determines what impact a manager's leadership approach has on the business working environment and makes appropriate recommendations to the user. This is accomplished via the working environment impact matrix analysis of FIG. 12. Referring to FIG. 12, if a working environment element has a score of '0', no approach recommendations are required. If a working environment element has a score of 1 or 2, the following occurs. If the corresponding arrow is pointed up and the working environment elements score is '1' or '2', then that working environment elements score is multiplied by the value of the approach score referenced above. The resulting metric is the "Approach Salience Based on Working Environment Result". This result suggests that the use of a particular approach in question should be used more frequently. An up arrow will appear next to the user's score, with accompanying text. If the arrow is down, then the approach values described above are to be reversed (i.e., Primary becomes 2, Secondary remains the same at 1, and Tertiary becomes 0). Then, the adjusted approach value is multiplied by the working environment elements score to get the "Approach Salience Based on Working Environment Result". This result suggests that the use of the particular approach in question should be used less frequently. A down arrow should appear next to the user's score, with accompanying text. A two-headed arrow is treated as an up arrow for purposes of analysis but adds a qualifier text for the user. For example, a qualifier may suggest that an increase in use of a particular approach for a short term period may have a positive impact on a working environment, however, a long term increase may be detrimental and is therefore not recommended. Based upon the above analyses, a personalized long-term career development training plan is generated by the tool at step 1020, a sample of which is shown generally in FIG. 13. The tool also tracks the progress made by the trainee and relates this information upon initiation of the tool at step 1022.

As can be seen, the training services tool allows a business enterprise to ensure customized training at any level in the organization by providing objective and personal feedback relating to each employee's weaknesses and strengths, while taking into account company needs and the employee's goals and interests. Employees who do not wish to submit to the personalized training program may still benefit from a wealth of training topics or may simply develop a training plan based upon a career track adopted by the business and the employee's interests.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for providing personalized training services over an electronic network, comprising:

receiving a request to generate a personalized training program by a user;

retrieving feedback surveys associated with said user, the feedback surveys received from peers of the user, direct reports of the user, and supervisors of the user feedback surveys including skill levels and knowledge acquired by the user as perceived by the peers, the direct reports, and the supervisors;

assessing self-perceived skill levels and knowledge acquired by the user via input received from the user in response to a questionnaire;

compiling information provided in the feedback surveys and the results of the assessing;

generating a training program for said user as a result of the compiling; and tracking progress of the user during implementation of the personalized training program.

2. The method of claim 1, wherein said generating a personalized training program includes providing access to a search engine of training resources.

3. The method of claim 1, wherein said generating a personalized training program includes providing the user with a listing of resource topics and links to resource materials.

4. The method of claim 1, wherein said generating a personalized training program includes transmitting topic alerts to said user with links to materials relating to newly acquired training resources.

5. The method of claim 1, further comprising scheduling a training lab upon successful completion of the personalized training program, the personalized training program operable for preparing the user for the training lab.

6. The method of claim 1, wherein said feedback surveys include questions for assessing leadership approaches of the user.

7. The method of claim 1, wherein said feedback surveys include questions for assessing leadership competencies of the user.

8. The method of claim 1, wherein said feedback surveys include questions for assessing working environment of the user.

9. The method of claim 1, wherein assessing self-perceived knowledge of the user is further accomplished via responses from said user to a quiz;
   wherein the compiling information provided in the feedback surveys and results of the assessing includes compiling the responses to the quiz.

10. The method of claim 1, wherein said generating a training plan for said user includes providing training resource recommendations wherein said user is ranked below a fiftieth percentile.

11. The system of claim 1, wherein said skill levels and knowledge are directed to leadership competencies, leadership approaches, and working environment information.

12. The method of claim 1, further comprising in response to the receiving a request to generate a personalized training program:
   determining currency of existing feedback surveys relating to the user;
   generating new feedback surveys for the user where the data for the existing feedback surveys is not current;
   identifying recipients of the new feedback surveys;
   transmitting the new feedback surveys to the recipients; and
   compiling responses provided in the new feedback surveys;
      wherein the generating a personalized training program for the user includes compiling information in the feedback surveys, the new feedback surveys, and the responses to the questionnaire.

13. The method of claim 1, wherein the skill levels are determined by comparing skills of the user with the skills of individuals in a same or similar position as the user.

14. The method of claim 13, further comprising;
   ranking the user among the individuals in a same or similar position of the user; and
   generating a user profile based on said ranking and providing the user profile to said user.

15. A method for providing personalized training services over an electronic network, comprising:
   receiving a request to generate a career development program by a user;
   retrieving feedback surveys associated with said user from a database, the feedback surveys received from peers of the user, direct reports of the user, and supervisors of the user, the feedback surveys including skill levels and knowledge acquired by the user as perceived by the peers, the direct reports, and the supervisors;
   receiving a response to a personal competency questionnaire as a result of a request to provide user-perceived leadership competency information;
   receiving a response to a business conditions questionnaire as a result of a request to provide user-perceived business conditions information;
   evaluating said feedback surveys, said response to said personal competency questionnaire, and said response to said business conditions questionnaire;
   generating a personalized long-term leadership development plan for said user as a result of said evaluating; and
   tracking progress of the user during implementation of said personalized long-term development plan.

16. The method of claim 15, wherein said providing said personalized training services includes providing the user with access to leadership development training topics and technical development training topics.

17. The method of claim 15, wherein said providing said personalized training services includes providing the user with a listing of resource topics and links to resource materials.

18. The method of claim 15, wherein said providing said personalized training services includes transmitting alerts and links for newly acquired training materials to said user.

19. The method of claim 15, wherein said feedback surveys include information relating to leadership approaches of the user.

20. The method of claim 15, wherein said feedback surveys include information relating to leadership competencies of the user.

21. The method of claim 15, wherein said feedback surveys include information relating to working environment of the user.

22. The method of claim 15, wherein said personal competency questionnaire includes directing said user to select three competencies from a listing of competencies determined by the user to be of most value.

23. The method of claim 15, wherein said business conditions questionnaire includes questions relating to a working environment created by said user.

24. The method of claim 15, wherein said evaluating said feedback surveys includes comparing responses to questionnaires with responses received relating to other assessed individuals and ranking said user based upon the comparing.

25. The method of claim 24, wherein said ranking said user includes generating a personal competency profile for said user listing a highest ranking, a lowest ranking, and rankings for each of said three competencies selected by said user.

26. The method of claim 15, wherein said evaluating said feedback surveys includes assigning an approach score to each survey score relating to said user's leadership approaches, said approach score comprising one of:
   a 0;
   a 1; and
   a 2.

27. The method of claim 26, wherein said 0 corresponds to a survey score wherein said user ranked greater than or equal to a 67th percentile.

28. The method of claim 26, wherein said 1 corresponds to a survey score wherein said user is ranked between a 50th percentile and a 66th percentile inclusively.

29. The method of claim 26, wherein said 2 corresponds to a survey score wherein said user is ranked below a 50th percentile.

30. The method of claim 15, wherein answers to said business conditions questionnaire range from 0 to 5.

31. The method of claim 30, wherein said answers are coded such that:
   each of answers 0, 1, and 2 are assigned a 0 condition code; and
   each of answers 3, 4, and 5 are assigned a 1 condition code.

32. The method of claim 15, wherein said business conditions questionnaire comprises questions grouped by leadership approach types.

33. The method of claim 32, wherein condition codes tallied for each group of said questions are combined resulting in a condition score.

34. The method of claim 33, wherein said condition score is multiplied by said approach score resulting in an approach salience based on conditions result.

35. The method of claim 34, wherein said approach salience based on conditions result includes a value associated with a recommendation for said user.

36. The method of claim 15, wherein said feedback surveys include responses relating a working environment of the user.

37. The method of claim 36, wherein said responses are coded as:
   a working environment condition code of 1 wherein either of:
   a gap of 20 points exist between an actual working environment score and a should be working environment score, said actual working environment score said should be working environment score are expressed as percentiles; and
   said actual working environment score is ranked in a lower third of a database as compared to working environment scores relating to other ranked individuals; and
   a working environment condition code of 0 wherein:
   a gap of less than 20 points exist between said actual working environment score and said should be working environment score; and
   said actual score is above a 33rd percentile; otherwise
   a working environment condition code of 2 is assigned.

38. The method of claim 37, wherein said working environment condition score is multiplied by said leadership approach score resulting in an approach salience based on working environment results.

39. The method of claim 38, wherein said approach salience based on working environment results numbers reflect a leadership approach associated with the user and a corresponding impact on a working environment.

40. The method of claim 39, wherein said numbers are associated with a recommended course of action for said user.

41. A storage medium encoded with machine-readable computer program code for providing personalized training services over an electronic network, the storage medium including instructions for causing a computer to implement a method, comprising:
   receiving a request to generate a personalized training program by a user;
   retrieving feedback surveys associated with said user, the feedback surveys received from peers of the user, direct reports of the user, and supervisors of the user, the feedback surveys including skill levels and knowledge acquired by the user as perceived by the peers, the direct reports, and the supervisors;
   assessing self-perceived skill levels and knowledge acquired by the user via input received from the user in response to a questionnaire;
   compiling information provided in the feedback surveys and results of the the assessing;
   generating a personalized training program for said user as a result of the compiling; and
   tracking progress of the user during implementation of the personalized training program.

42. The storage medium of claim 41, wherein said generating a personalized training program includes providing the user with access to a search engine of training resources.

43. The storage medium of claim 41, wherein said generating a personalized training program includes providing the user with a listing of resource topics and links to resource materials.

44. The storage medium of claim 41, wherein said generating a personalized training program includes transmitting topic alerts to said user with links to materials relating to newly acquired training resources.

45. The storage medium of claim 41, further comprising instructions for causing the computer to implement scheduling a training lab upon successful completion of the personalized training program, the personalized training program operable for preparing the user for the training lab.

46. The storage medium of claim 41, wherein said feedback surveys include information relating to leadership approaches of the user.

47. The storage medium of claim 41, wherein said feedback surveys include information relating to leadership competencies of the user.

48. The storage medium of claim 41, wherein said feedback surveys include information relating to working environment of the user.

49. The storage medium of claim 41, wherein said assessing self-perceived knowledge of the user is further accomplished via responses from said user to a quiz;
   wherein the compiling information in the feedback surveys and results of the assessing includes compiling the responses to the quiz.

50. The storage medium of claim 41, wherein said generating a training plan for said user includes providing training resource recommendations wherein said user is ranked below a fiftieth percentile.

51. The storage medium of claim 41, further comprising instructions for causing the computer to implement:
   in response to the receiving a request to generate a personalized training program;
   determining currency of existing feedback surveys relating to the user;
   generating new feedback surveys for the user where the data for the existing feedback surveys is not current;
   identifying recipients of the new feedback surveys;
   transmitting the new feedback surveys to the recipients; and
   compiling responses provided in the new feedback surveys;
   wherein the generating a personalized training program for the user includes compiling information in the feedback surveys, the new feedback surveys, and the responses to the questionnaire.

52. The storage medium of claim 41, wherein the skill levels are determined by comparing skills of the user with the skills of individuals in a same or similar position as the user.

53. The storage medium of claim 52, further comprising instructions for causing the computer to implement:
   racking the user among individuals in a same or similar position of the user;
   generating a user profile based on said ranking; and
   providing the user profile to said user.

54. A storage medium encoded with machine-readable program code for providing personalized training services over an electronic network, the program code including instructions for causing a computer to implement a method, comprising:
   receiving a request to generate a career development program by a user;
   retrieving feedback surveys associated with said user from a database, the feedback surveys received from peers of the user, direct reports of the user, and supervisors of the user, the feedback surveys, including skill levels and knowledge acquired by the user as perceived by the peers, the direct reports, and the supervisors;
   receiving a response to a personal competency questionnaire s a result of a request to provide self-perceived leadership competency information;
   receiving a response to a business conditions questionnaire as a result of a request to provide self-perceived business conditions information;
   evaluating said feedback surveys, said response to said personal competency questionnaire, and said response to said business conditions questionnaire;
   generating a personalized long-term leadership development plan for said user as a result of said evaluating; and
   tracking progress of the user during implementation of said personalized long-term leadership development plan.

55. The storage medium of claim 54, wherein said providing said personalized training services includes providing the user with access to leadership development training topics and technical development training topics.

56. The storage medium of claim 54, wherein said providing said personalized training services includes providing the user with a listing of resource topics and links to resource materials.

57. The storage medium of claim 54, wherein said providing said personalized training services includes transmitting alerts and links for newly acquired training materials to said user.

58. The storage medium of claim 54, wherein said feedback surveys include information relating to leadership approaches of the user.

59. The storage medium of claim 54, wherein said feedback surveys include information relating to leadership competencies of the user.

60. The storage medium of claim 54, wherein said feedback surveys include information relating to working environment of the user.

61. The storage medium of claim 54, wherein said personal competency questionnaire includes directing said user to select three competencies from a listing of competencies determined by the user to be of most value.

62. The storage medium of claim 54, wherein said business conditions questionnaire includes questions relating to a working environment created by said user.

63. The storage medium of claim 54, wherein said evaluating said feedback surveys includes comparing responses to questionnaires with responses received relating to other assessed individuals and ranking said user based upon the comparing.

64. The storage medium of claim 63, wherein said ranking said user includes generating a personal competency profile for said user listing a highest ranking, a lowest ranking, and rankings for each of said three competencies selected by said user.

65. The storage medium of claim 54, wherein said evaluating said feedback surveys includes assigning an approach score to each survey score relating to said user's leadership approaches, said approach score comprising one of:
   a 0;
   a 1; and
   a 2.

66. The storage medium of claim 65, wherein said 0 corresponds to a survey score wherein said user is ranked greater than or equal to a 67th percentile.

67. The storage medium of claim 65, wherein said 1 corresponds to a survey score wherein said user is ranked between a 50th percentile and a 66th percentile inclusively.

68. The storage medium of claim 65, wherein said 2 corresponds to a survey score wherein said user is ranked below a 50th percentile.

69. The storage medium of claim 54, wherein answers to said business conditions questionnaire range from 0 to 5.

70. The storage medium of claim 69, wherein said answers are coded such that:
   each of answers 0, 1, and 2 are assigned a 0condition code; and
   each of answers 3, 4, and 5 are assigned a 1 condition code.

71. The storage medium of claim 54, wherein said business conditions questionnaire comprises questions grouped by leadership approach types.

72. The storage medium of claim 71, wherein condition codes tallied for each group of said questions are combined resulting in a condition score.

73. The storage medium of claim 72, wherein said condition score is multiplied by said approach score resulting in an approach salience based on conditions result.

74. The storage medium of claim 73, wherein said approach salience based on conditions result includes a value associated with a recommendation for said user.

75. The storage medium of claim 54, wherein said feedback surveys include responses relating to a working environment of the user.

76. The storage medium of claim 75, wherein said responses are coded as:
   a working environment condition code of 1 wherein either of:
   a gap of 20 points exist between an actual working environment score and a should be working environment score exist, said actual working environment score and said should be working environment score are expressed as percentiles; and
   said actual working environment score is ranked in a lower third of a database as compared to working environment scores relating to other ranked individuals; and
   a working environment condition code of 0 wherein:
   a gap of less than 20 points exist between said actual working environment score and said should be working environment score; and said actual score is above a 33rd percentile, otherwise a working environment condition code of 2 is assigned.

77. The storage medium of claim 76, wherein said working environment condition scores is multiplied by said leadership approach score resulting in an approach salience based on working environment results.

78. The storage medium of claim 77, wherein said approach salience based on working environment results number reflect a leadership approach associated with the user and corresponding impact on a working environment.

79. The storage medium of claim 78, wherein said numbers are associated with a recommended course of action for said user.

80. A system for providing personalized training services over an electronic network, comprising:
   a business enterprise including:
   a user client system;
   a peer client system;
   a direct report client system;
   a supervisor client system;
   a data storage device comprising:
      a feedback database storing feedback surveys;
      a training module database; and
      a competencies database;
   a server cluster executing a training services application;
   a firewall; and
   a communications network;
   wherein said client systems, said data storage device, said firewall and said server cluster are in communication with each other via said communications network; and
   wherein further, in response to receiving a request for a personalized training program from a user on the user client system the training services application performs;
      retrieving feedback surveys associated with said user from the feedback database, the feedback surveys received from the peer client system, the direct report client system, and the supervisor client system, the feedback surveys including skill levels and knowledge acquired by the user as perceived by peers, direct reports, and supervisors;
   assessing self-perceived skill levels and knowledge acquired by the user via input received from the user client system in response to a questionnaire;
   compiling information provided in the feedback surveys and the results of the assessing;
   generating a personalized training program for said user as a result of the compiling; and
   tracking progress of the user during implementation of the personalized training program.

81. The system of claim 80, wherein said responses to said feedback surveys are assessed, weighted, and ranked resulting in a personalized training program.

* * * * *

Disclaimer

6,944,624 B2 — Peter Z. Orton, Hillsborough, NC (US); Nancy J. Lewis, Pleasantville, NY (US); Dick W. Richardson, Charlotte, NC (US); Leon S. Wasson, Thorton, CO (US); John M. Wattendorf, Alexandria, VA (US). METHOD AND SYSTEM FOR CREATING AND IMPLEMENTING PERSONALIZED TRAINING PROGRAMS AND PROVIDING TRAINING SERVICES OVER AN ELECTRONIC NETWORK. Patent dated September 13, 2005. Disclaimer filed October 6, 2006, by the assignee, International Busines Machines Corporation.

Hereby enters this disclaimer to claims 1-81, of said patent.

*(Official Gazette October 14, 2008)*